US009565104B2

(12) United States Patent
Zhang et al.

(10) Patent No.: US 9,565,104 B2
(45) Date of Patent: Feb. 7, 2017

(54) SWITCH CONTROLLER

(71) Applicant: Hangzhou H3C Technologies Co., Ltd., Hangzhou (CN)

(72) Inventors: Lianlei Zhang, Beijing (CN); Tao Lin, Beijing (CN); Weichun Ren, Beijing (CN); Yang Liu, Beijing (CN); Shaobo WU, Beijing (CN)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 82 days.

(21) Appl. No.: 14/018,124

(22) Filed: Sep. 4, 2013

(65) Prior Publication Data

US 2014/0241353 A1 Aug. 28, 2014

(30) Foreign Application Priority Data

Feb. 28, 2013 (CN) .......................... 2013 1 0063008

(51) Int. Cl.
- *H04L 12/50* (2006.01)
- *H04L 12/741* (2013.01)
- *H04L 12/931* (2013.01)
- *H04L 12/937* (2013.01)

(52) U.S. Cl.
CPC ............. *H04L 45/74* (2013.01); *H04L 49/253* (2013.01); *H04L 49/351* (2013.01)

(58) Field of Classification Search
CPC ...................................... H04L 12/18
USPC ........................................... 370/390
See application file for complete search history.

(56) References Cited

U.S. PATENT DOCUMENTS

| 2010/0257263 A1 | 10/2010 | Casado et al. |
| 2012/0099591 A1 | 4/2012 | Kotha et al. |
| 2012/0275328 A1 | 11/2012 | Iwata et al. |
| 2012/0287930 A1* | 11/2012 | Raman .................... H04L 45/02 370/392 |
| 2012/0287936 A1* | 11/2012 | Biswas et al. ............. 370/395.3 |
| 2012/0324442 A1 | 12/2012 | Barde |
| 2013/0086236 A1 | 4/2013 | Baucke et al. |
| 2014/0098813 A1* | 4/2014 | Mishra et al. ................. 370/390 |
| 2014/0192804 A1* | 7/2014 | Ghanwani et al. ........... 370/390 |

FOREIGN PATENT DOCUMENTS

| CN | 101631062 | 1/2010 |
| CN | 102594689 A | 7/2012 |
| CN | 102780608 A | 11/2012 |

(Continued)

OTHER PUBLICATIONS

Huang et al., "Programmable Network Architecture in Cloud Computing", Mar. 28, 2012.

(Continued)

*Primary Examiner* — Samina Choudhry
(74) *Attorney, Agent, or Firm* — Hewlett Packard Enterprise Patent Department

(57) ABSTRACT

According to an example, a switch controller is connected to a computer hosting a virtual machine (VM) and a virtual switch to provide packet forwarding for the VM. The switch controller restricts packet forwarding actions on the ports according to the assigned primary VLAN, the assigned secondary VLAN, and the assigned VDS to the ports and the stored rules.

16 Claims, 5 Drawing Sheets

(56) References Cited

FOREIGN PATENT DOCUMENTS

| | | |
|---|---|---|
| CN | 102857416 A | 1/2013 |
| CN | 102868645 | 1/2013 |
| EP | 2408155 | 1/2012 |

OTHER PUBLICATIONS

Office Action, CN Application No. 201310063008.8, Date: Sep. 23, 2016, pp, 1-8, SIPO.

* cited by examiner

SWITCH CONTROLLER

CLAIM FOR PRIORITY

The present application claims priority under 35 U.S.C 119 (a)-(d) to Chinese Patent application number 201310063008.8, filed on Feb. 28, 2013, which is incorporated by reference herein in its entirety.

BACKGROUND

With the continuous increase in data center services, users' demands are increasing and the scale and functions of data centers are increasing in size and complexity. Virtualization is commonly employed to make full use of data center resources and meet higher service demands. The virtualization may include hosting virtual machines (VMs) on physical servers. Each of the VMs may operate independently without influencing each other, and have its own operating system, applications and virtual hardware environment.

The VMs may communicate with each other and to the outside world using a virtual switch. The virtual switch may be software running with VM management software to implement switching between VMs and between the VMs and external hosts. The virtual switch may perform Edge Virtual Bridging (EVB), which is an IEEE standard that facilitates the interaction between virtual switching environments and the first layer of the physical switching infrastructure. The virtual switch may be a virtual Ethernet bridge (VEB) which is generally software that acts similar to a layer 2 hardware switch providing inbound/outbound and inter-VM communication. A VEB can aggregate VM traffic as well as provide frame delivery between VMs based on Media Access Protocol (MAC) addresses. Also, the VEB may implement Virtual Edge Port Aggregator (VEPA) standard. The VEPA hands all the network traffic generated by the VM to the physical switch connected to the server hosting the VM for processing. Even the traffic among VMs hosted on the same server is processed on the physical switch and returned to the destination VM on the server. The VEPA realizes traffic forwarding among VMs through the physical switch, and also realizes supervision of the traffic of the VMs.

BRIEF DESCRIPTION OF THE DRAWINGS

Features of the present disclosure are illustrated by way of example and not limited in the following figure(s), in which like numerals indicate like elements, in which.

DETAILED DESCRIPTION

Figure 1:
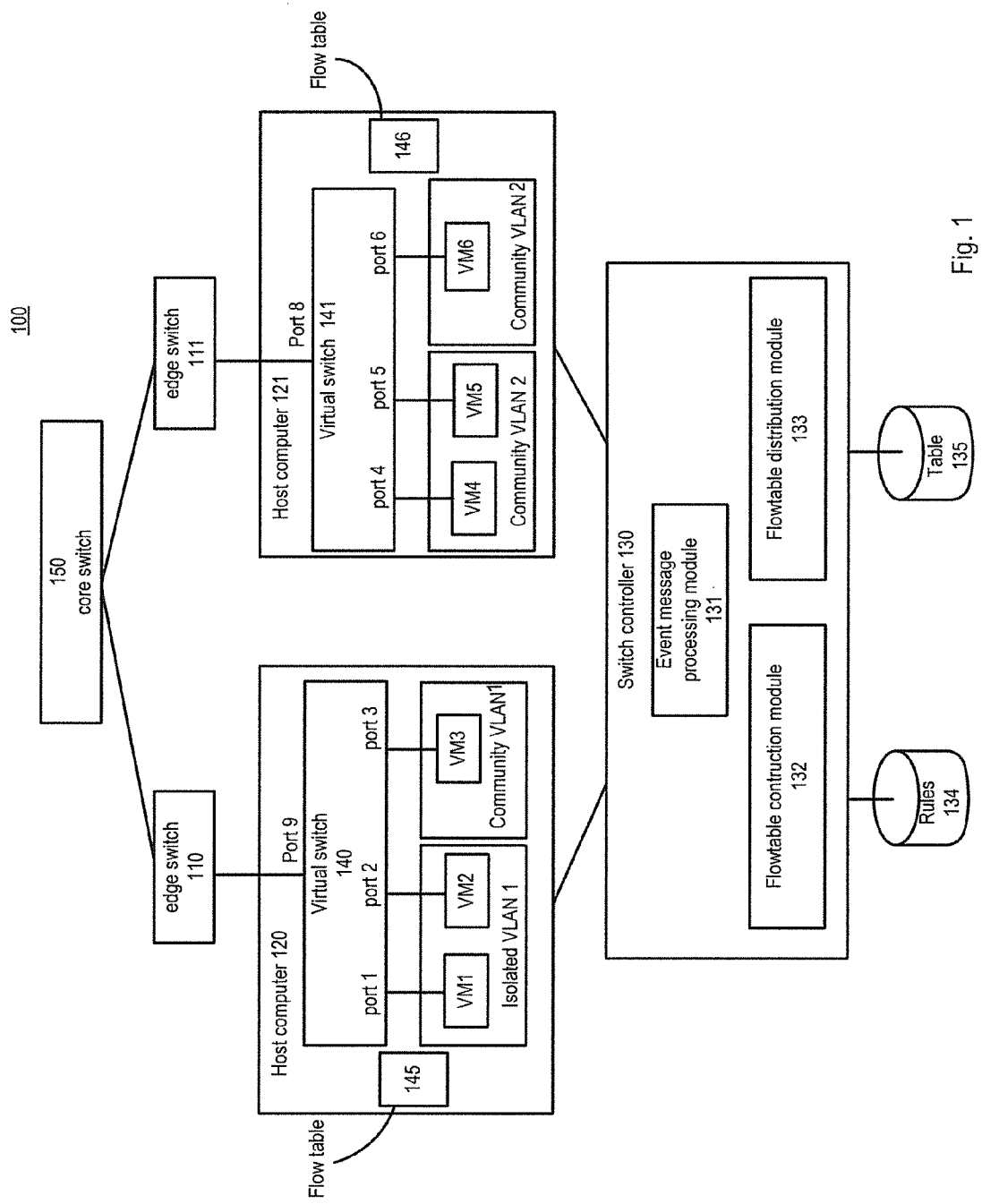
FIG. 1 illustrates a system according to an example.

Hereinafter, the present disclosure will be described in further detail with reference to the accompanying drawings and examples to make the technical solution and merits therein clearer.

In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. As used herein, the term "includes" means includes but not limited to, the term "including" means including but not limited to. The term "based on" means based at least in part on. In addition, the terms "a" and "an" are intended to denote at least one of a particular element.

Software defined networking (SDN) separates a control plane and a data plane. The control plane determines rules for routing packets and is implemented in software. The control plane may be provided in a central controller separate from network switches. The data plane forwards the packets and is located at the switches. The SDN architecture allows a network administrator to have programmable central control of network traffic without physically accessing the switches. Essentially, this allows use of less expensive, commodity switches and provides more control over network traffic. Currently, a popular SDN standard for an SDN network is OPENFLOW. OPENFLOW is an open standard maintained by the Open Networking Foundation. OPENFLOW enables a controller in the control plane to control routing in the data plane through a forwarding instruction set. Examples described below are generally described with respect to OPENFLOW. However, the systems, functions and methods described below can be used in an SDN architecture that may use a standard other than OPENFLOW.

According to an example, a private virtual local area network (PVLAN) is implemented based on an SDN protocol, such as OPENFLOW. The PVLAN may include VMs and virtual switches. The virtual switches for example are software (e.g., machine readable instructions) rather than hardware switches implementing switching between VMs and between the VMs and external hosts. The virtual switches may include a VEPA switch that implements the VEPA standard described in the IEEE 802.1qbh. A VLAN for example is a partition of a layer 2 network. Layer 2 refers to the layer 2 in the Open Systems Interconnection (OSI) model, and a layer 2 network uses MAC addresses for packet forwarding. VLANS in the network may be isolated and packets may be passed between the VLANs via one or more routers.

A PVLAN is a VLAN with virtual switch ports that are restricted. For example, the restriction may include restrictions on actions that are performed though the ports. For example, restricted ports only communicate with a particular uplink port to send packets or that restricted ports cannot send packets based on predetermined VLAN rules. An uplink port may be connected to a physical switch, firewall, server, or other host or network switch. The PVLAN divides the VLAN into a primary VLAN and a secondary VLAN. The secondary VLAN may include sub-VLANs. Types of the sub-VLANs may include a community VLAN and an isolated VLAN. For the community VLAN, ports in the same community VLAN can communicate with each other, but cannot communicate with other community VLANs. For example, if an ingress port and a destination port of a packet belong to the same community VLAN and are in the same primary VLAN, a packet can be forwarded between the ports. Also, ports in a community VLAN can communicate with ports outside of the virtual distributed switch (VDS). For the isolated VLAN, ports in the same isolated VLAN cannot communicate with each other. For example, ports in the isolated VLAN can only communicate with ports outside of the VDS where they are located, but they cannot communicate with ports in any isolated VLAN or community VLAN in the same VDS. The community VLAN and the isolated VLAN can both communicate with a switch for the primary VLAN.

According to an example, a system may include a switch controller, a server and an edge switch. The server hosts VMs, and each VM may include a virtual network interface controller (vNIC) connected to a virtual switch that can run an SDN standard, such as OPENFLOW. A vNIC may be connected to a physical port of a switch. Multiple vNICs may be connected to one physical port. The virtual switch may be a VEPA switch. The switch controller may be a central controller in the control plane to control routing in the data plane through a forwarding instruction set defined in the SDN standard.

Port numbers of the virtual switch are allocated to the VMs. The virtual switch stores a flow table or multiple flow tables including entries for forwarding packets. The virtual switch can forward packets received from the VMs, and the edge switch according to a flow table. Packets for example are layer 2 packets (e.g., frames) forwarded based on MAC addresses. The virtual switch, upon receiving a packet, can search its local flow table according to the destination MAC address and the port number (e.g., ingress port number) of the received packet to determine an egress port for forwarding the packet.

In one example, the switch controller runs the VEPA standard and the OPENFLOW standard to create a VDS. Host computers are configured to join a corresponding VDS to generate a forwarding plane of the VDS, and the uplink ports (e.g., the ports of the VEPA switches that are connected to edge switches) are configured to join the primary VLAN. The downlink ports (e.g., the ports of the VEPA switches that are connected to the VMs) are configured to join the corresponding secondary VLAN. Both downlink ports and uplink ports are configured to join the corresponding VDS.

The switch controller stores a MAC address for each VM, and corresponding ports. The switch controller also stores VDS ID and VLAN ID for each VM and port. In one example, a port joining a certain port group loads configurations of the port group, such as the VLAN configuration, VDS configuration, etc. After starting of each of the virtual machines, event messages are sent to the switch controller, so the switch controller can maintain the information such as the MAC addresses, corresponding ports and the VLAN to which each of the ports belongs.

As discussed above, according to an example, a method for creating a PVLAN including a primary VLAN and secondary VLANs. The method can create the PVLAN without copying MAC tables from the secondary VLAN into the primary VLAN. Accordingly, the number of table entries of the primary VLAN is smaller and occupies less memory. Also, a smaller primary VLAN table can increase forwarding speed because a smaller table is searched for packet forwarding.

FIG. 1 illustrates an example of system 100. The system 100 includes switch controller 130 connected to host computers 120 and 121. The system 100 may include edge switches 110 and 111 connected to a core switch 150. The number of switches and hosts shown in FIG. 1 for the system 100 is illustrated by way of example. The system 100 may include one edge switch and host computer or multiple edge switches and host computers. In a data center environment, multiple host computers, which may include servers, and multiple edge switches may be used and may connect to multiple core switches. An edge switch is a switch connecting a host computer to a network. A core switch is a switch in the network that may perform routing in the network. A host computer is a computer that includes resources, such as processor, data storage device, network interface, etc., which can host a VM and virtual switch. The edge switches 110 and 111 may be physical switches external to the host computers 140 and 141.

The host computers 120 and 121 can each host one or more VMs and virtual switches. For example, virtual switch 140 and VMs 1-3 are shown as hosted on host computer 120, and virtual switch 141 and VMs 4-6 are shown as hosted on host computer 121. More VMs and virtual switches may be hosted on each host computer.

The switch controller 130 for example is a computer that can operate as the control plane in an SDN architecture, and the data plane in the SDN architecture includes the virtual switches 140 and 141. For example, the switch controller 130 is a computer that can remotely program the virtual switches 140 and 141 and other virtual switches and physical switches that may be in the system 100. For example, the switch controller 130 can send instructions that may include one or more actions to be performed by a switch in the data plane, such as the virtual switches 140 and 141, for a particular flow or for one particular packet. A flow includes packets that have common attributes, such as common source and destination Internet Protocol (IP) addresses or MAC addresses, and other attributes which may be associated with any of layers 1-4 of the OSI model. An action may include an operation performed at the switch that for example forwards a packet to a port, floods the packet, or modifies the packet, such as decrementing a time to live field. In one example, the switch controller 130 constructs and sends flow tables to the virtual switches 140 according to VM membership in secondary VLANs and facilitates packet forwarding according to packet forwarding rules for the different types of secondary VLANs, as is further described below.

The switch controller 130 for example is a remote controller that runs on a computer separate from the host computers 120 and 121. For example, the switch controller 130 runs on its own server. In one example, the virtual switches 140 and 141 are OPENFLOW switches and the switch controller 130 is an OPENFLOW controller, and the virtual switches 140 and 141 and the switch controller 130 operate according to the OPENFLOW standard. The virtual switches 140 and 141 may be VEPA switches that implement the VEPA standard along with the switch controller 130. For example, a VEPA switch sends all network traffic to the edge switch for routing even if the destination is another VM on the same host.

The virtual switches 140 and 141 may store local flow tables 145 and 146 respectively, which include entries received from the switch controller 130. An entry in a flow table may include a matching field and an instruction. The entries may include other information as well. The matching field may also be a field in a packet header so the packet can be matched with a table entry. One example of an instruction may include an instruction to forward the packet to a particular port, which is a virtual port of the virtual switches 140 and 141. For example, virtual switch 140 includes ports 1-3 and 9, and virtual switch 141 includes ports 4-6 and 9. Ports 1-9 are virtual ports of virtual switches. The virtual ports 8 and 9 connected to the edge switches 140 and 141 are uplink ports and the virtual ports 1-3 and 4-6 connected to the VMs 1-6 are downlink ports.

If any of the virtual switches 140 and 141 receives a packet, for example, from one of the VMs 1-6 or from an external computer, the virtual switches 140 and 141 check their flow tables 145 and 146 to determine whether an entry matches the received packet according to the matching field (e.g., source MAC address or destination MAC address). If a matching entry is found, the virtual switch performs the instruction of the entry, such as forwarding the packet to a designated port. If no matching entry is found, the packet is sent to the switch controller 130 so the switch controller 130 can determine how to process the packet.

The switch controller 130 for example includes event message processing module 131, flow table construction module 132 and flow table distribution module 133. The modules 131-133 may include machine readable instruction executable by a processor to perform their functions or hardware, such as a customized integrated circuit designed to perform a specific function or functions (e.g., application-specific integrated circuit (ASIC) or field-programmable gate arrays (FPGAs)). The switch controller 130 may include other modules not shown.

The event message processing module 131 receives event messages from the switches connected to the switch controller 130, such as the virtual switches 140 and 141, and processes the event messages according to rules 134 which may be specified in a standard implemented by the switch controller 130. An event message for example is any message from a switch managed by the switch controller 130. An event message may include a packet received by any of the virtual switches 140 or 141 that does not have a matching entry in the local flow table which is sent to the switch controller 130.

The flow table construction module 132 constructs entries for the flow tables of the switches managed by the switch controller 130, for example, according to rules 134 and information in table 135. The rules 134 may be entered by a system administrator or another type of user. The rules 134 may be specified in a standard (e.g., OPENFLOW or VEPA) implemented by the virtual switches 140 and 141 and switch controller 130. The rules 134 may also specify how to process packets according to VLAN and VDS membership.

The flow table distribution module 133 for example sends the entries to the virtual switches 140 and 141. The entries may be sent in controller-to-switch messages that specify switch programming actions, such as add, update, and delete entries. The entries may be created reactively, such as in response to receiving a packet from one of the virtual switches 140 or 141 or proactively. The entries may be created from information in the table 135. The information in the table 135 may include matching field, instruction, and other information. The information in the table 135 may include a port and a MAC address for ports in the switches managed by the switch controller 130. A port may be a virtual port of one of the virtual switches 140 or 141, and may include an ingress port and/or an egress port. The MAC address may include a source MAC address and/or a destination MAC address. The ingress port for example is a virtual port on which the packet is received, and the egress port for example is a virtual port associated with the destination MAC address. The information may include a VLAN ID and a VDS ID for the ingress port if it is a downlink port. In addition to constructing and distributing flow tables for the virtual switches 140 and 141, the switch controller 130 may discard or forward event messages from the virtual switches 140 and 141 according to the rules 134.

The switch controller 130 can create VDSs. A VDS may be created according to the standard implemented by the switch controller 130. For example, VEPA and OPENFLOW may be used to create a VDS. A VDS ID is assigned to each VDS.

The switch controller 130 can join each of the host computers 120 and 121 to a VDS. Also, as facilitated by the switch controller 130, uplink ports of the virtual switches 140 and 141 join a primary VLAN and downlink ports of the virtual switches 140 and 141 join a sub-VLAN, such as an isolated VLAN or a community VLAN. Also, both the downlink ports and the uplink ports join the corresponding VDS. The sub-VLANs may be in a second VLAN for the primary VLAN. The primary and secondary VLANs may be on the same device, such as one of the host computers 120 or 121.

The switch controller 130 maintains the MAC addresses, the port numbers, VDS assignments and the VLAN assignments for example in the table 135. For example, after assigning the VDS to a host computer, e.g., host computer 120, the VDS ID and the corresponding host computer 120 are stored in the table 135. After a VM (e.g., VM 1) is started on the host computer 120, a vNIC (not shown) for VM1 can send a vNIC event message to the switch controller 130. The switch controller 130 determines the VDS ID of the host computer 120 from the vNIC event message, and assigns the port numbers, which are stored in the table 135. The MAC address of the VM is stored with the port numbers and the VDS ID. Also, the primary and sub-VLAN IDs of the ports are stored in the table 135.

The information in the table 135 may be used in conjunction with the rules 134 for event message processing. The rules 134 may be used to process the event messages based on sub-VLAN type. For example, the rules 134 may specify that ports in the same community VLAN can communicate with each other, but they cannot realize layer 2 communications with other community VLANs. Also, ports in the same Isolated VLAN cannot communicate with each other in layer 2. Also, a community VLAN and an isolated VLAN can both communicate with the primary VLAN. Event messages may be discarded by the switch controller 130 based on the rules 134 and flow tables may be created based on the rules 134.

Examples of constructing flow tables for switches, including the virtual switches 140 and 141, managed by the switch controller 130 are discussed below, along with example of event message processing for community and isolated sub-VLANs. The examples describe processing uplink and downlink unicast, multicast and broadcast messages. Uplink means that a message is sent from a VM to the virtual switch and downlink means that a message enters from an uplink port in the virtual switch and may be forwarded to a destination VM.

The switch controller 130 stores the MAC addresses of the VMs, the corresponding port numbers, the corresponding VLAN IDs and the corresponding VDS IDs. The switch controller 130 also stores the primary VLAN and sub-VLAN information for the ports. In the examples below, the switch controller 130 configures primary VLANs 1 and 2 and sub-VLANs. Isolated VLAN 1 and community VLAN 1 are sub-VLANs of primary VLAN 1, and isolated VLAN 2 and community VLAN 2 are sub-VLANs of primary VLAN 2. Ports 8 and 9 are assigned as ingress ports for primary VLANs 1 and 2 respectively. Downlink ports 1 and 2 are assigned to isolated VLAN 1 connected to VMs 1-2. Similarly, port 3 is assigned to community VLAN 1; ports 4 and 5 are assigned to community VLAN 2; and port 6 is assigned to isolated VLAN 2.

Suppose that VM 1 generates a unicast packet which is sent to the virtual switch 140 via port 1, and the virtual switch 140 searches for a corresponding flow table entry in its flow table 145 according to the ingress port number and destination MAC address of the unicast packet. If the matching flow table entry is found, the unicast packet is forwarded according to the action specified in the matching flow table entry. If a matching flow table entry is not found, the unicast packet is forwarded to the switch controller 130 as an event message including the unicast packet.

The switch controller 130 receives the event message, and processes the unicast packet according to the rules 134. The rules 134 for example specify that for an isolated VLAN, ports in the isolated VLAN can only communicate with ports outside of the VDS where they are located, but they cannot communicate with ports in any isolated VLAN or community VLAN in the same VDS. Ports in the same isolated VLAN cannot communicate with each other. Accordingly, if the source and destination MAC addresses of the unicast packet belong to the same VDS, the message is discarded. Otherwise, the switch controller 130 generates a flow table entry for the unicast message and sends it to the virtual switch 140. Table 1 shows an example of the flow table entry distributed to the virtual switch 140 for the unicast packet sent by VM1.

TABLE 1

| Header Fields | | Action | |
|---|---|---|---|
| Ingress Port | Ether Dst | Forward | Modify Fields |
| Port 1 | MAC 8 | Output to port 4 | Set VLAN ID: Primary VLAN 1 |

In table 1, suppose that the destination MAC address of the unicast packet is MAC 8 and is not in the VDS; the ingress port number is determined according to the port corresponding to the source MAC address of the unicast packet. The action includes a packet forwarding port (via which the packet is forwarded) and a primary VLAN ID that is used for forwarding the unicast packet to the destination. For example, the action field includes setting the VLAN to be a primary VLAN and forwarding via the uplink port. The flow table entry is stored in the flow table 145. When another packet is received via port 1 and whose destination MAC address is MAC 8, the packet is forwarded according to the flow table entry which is considered a matching flow table entry.

In another example, suppose VM1 sends a broadcast packet or multicast packet. The virtual switch 140 searches for a matching flow table entry in the flow table 145 according to the ingress port number and destination MAC address of the broadcast or multicast packet. If a matching entry is found, it is forwarded according to the action in the matching entry.

If the matching entry is not found, the packet is sent to the switch controller 130. The switch controller 130 receives the multicast or broadcast packet, and creates and distributes a flow table entry for the multicast or broadcast packet assuming the packet is for a different VDS. Table 2 shows an example of a flow table entry for a multicast packet sent by VM1, and table 3 shows an example of a flow table entry for a broadcast packet sent by VM1. In table 2, the "multicast group MAC address" is the actual multicast group MAC address.

TABLE 2

| Header Fields | | Action | |
|---|---|---|---|
| Ingress Port | Ether Dst | Forward | Modify Fields |
| Port 1 | multicast group MAC address | Output to port 4 | Set VLAN ID: Primary VLAN 1 |

TABLE 3

| Header Fields | | Action | |
|---|---|---|---|
| Ingress Port | Ether Dst | Forward | Modify Fields |
| Port 1 | FF:FF:FF:FF:FF:FF | Output to port 4 | Set VLAN ID: Primary VLAN 1 |

In another example, suppose the host computer 120 receives a downlink unicast packet from edge switch 110. A unicast packet sent by an edge switch to a virtual switch connected to the edge switch is called a downlink unicast packet and the broadcast packet sent by the edge switch is called a downlink broadcast packet. The unicast packet is received on port 9 and the flow table 145 is searched for a matching flow table entry according to the ingress port, source MAC address and destination MAC address of the unicast packet. If a matching entry is found, its action is executed. If not, the unicast packet is sent to the switch controller 130. The switch controller 130 creates a flow table entry for the unicast packet according to the destination MAC address of the unicast packet, since the unicast packet is controlled when being sent uplink. For example, if the destination MAC address of the received unicast packet is MAC 1 and the source MAC address of the unicast packet is MAC 9, the unicast packet is forwarded to VM 1 via port 1. Table 4 shows an example of the flow table entry which is distributed to the virtual switch 140.

TABLE 4

| Header Fields | | | | Action |
|---|---|---|---|---|
| Ingress Port | VLAN ID | Ether Src | Ether Dst | Forward |
| Uplink Port 9 | Primary VLAN 1 | MAC 9 | MAC 1 | Output to port 1 |

In another example, assume the host computer 120 receives a downlink multicast or broadcast packet forwarded by the edge switch 110. If the switch controller 130 receives the downlink multicast or broadcast packet forwarded by the virtual switch 140 because no matching entry in the flow table 145 is found, it creates and distributes a flow table entry to the virtual switch 140. For example, if the packet is a multicast packet, then a port included in the multicast group is included in the flow table entry. Table 5 shows an example of the flow table entry where port 1 is in the multicast group.

TABLE 5

| Header Fields | | | | Action |
|---|---|---|---|---|
| Ingress Port | VLAN ID | Ether Src | Ether Dst | Forward |
| Uplink Port 9 | Primary VLAN 1 | MAC 9 | Multicast group MAC address | Output to port 1 |

The flow table entry created and distributed for a downlink broadcast packet is similar to that for the multicast packet.

In the host computer 121, according to an example, the secondary VLAN of the port corresponds to MAC 4 and is in community VLAN 2, and its corresponding primary VLAN is primary VLAN 2, and the corresponding ingress port is port 4. Also, the secondary VLAN of the port corresponding to MAC 5 is community VLAN 2, and its corresponding primary VLAN is primary VLAN 2, and the corresponding ingress port is port 5. The secondary VLAN of the port corresponding to MAC 6 is Community VLAN 2, and its corresponding primary VLAN is primary VLAN 2, and the corresponding ingress port is port 6. The ingress port corresponding to the primary VLAN 2 is port 8. Rules 134 for community VLANs is that ports in the same community VLAN can communicate with each other, but cannot communicate with other community VLANs. Also, ports may communicate packets outside their VDS. If the packets do not satisfy these rules the packets are discarded.

Suppose that VM 4 generates a unicast packet which is sent to the virtual switch 141 via port 4, and the virtual switch 141 sends the unicast packet to the switch controller 130 because a matching flow entry is not found in the flow table 146. The switch controller 130 receives the unicast packet from the virtual switch 141, and determines whether the destination port of the unicast packet belongs to the VDS to which the source port of the unicast packet belongs, and determines whether the destination port and source port of the unicast packet belong to the same Community VLAN of the same primary VLAN, i.e., determining whether the destination port belongs to the Community VLAN 2 in Primary VLAN 2. If yes, a flow table entry is created and distributed to the virtual switch 141. If the source and destination port do not belong to the same community VLAN, the unicast packet is discarded. If it is determined that the destination port of the unicast packet does not belong to the VDS to which the source port of the unicast packet belongs, namely, the unicast packet is to be sent to a destination outside of the VDS where the host computer 121 resides, a flow table entry is created and distributed to the virtual switch 141.

Table 6 shows an example of the flow table entry that is created for a unicast packet sent by VM4.

TABLE 6

| Header Fields | | Action | |
| --- | --- | --- | --- |
| Ingress Port | Ether Dst | Forward | Modify Fields |
| Port 4 | MAC 5 | Output to port 8 | Set VLAN ID: Primary VLAN 2 |

In table 6, the destination MAC address of the unicast packet is MAC 5. The ingress port number is determined according to the ingress port of the unicast packet. The action includes a packet forwarding port and a primary VLAN ID for forwarding the unicast packet.

In another example, assume VM 4 sends a broadcast or multicast packet. The virtual switch 141 searches for a matching flow table entry in the flow table 146 according to the ingress port number and destination MAC address of the broadcast or multicast packet. If a matching entry is found, the broadcast or multicast packet is forwarded according to the action in the entry. If a matching entry is not found, the broadcast or multicast packet is forwarded to the switch controller 130. The switch controller 130 creates and distributes a flow table entry to the virtual switch 141 for forwarding the broadcast or multicast packet. Table 7 shows an example of a multicast packet flow table entry for a multicast packet sent by VM 4, and table 8 shows an example of a broadcast packet flow table entry for a broadcast packet sent by VM 4.

TABLE 7

| Header Fields | | Action | |
| --- | --- | --- | --- |
| Ingress Port | Ether Dst | Forward | Modify Fields |
| Port 4 | Multicast group MAC address | Output to port 8 | Set VLAN ID: Primary VLAN 2 |

TABLE 8

| Header Fields | | Action | |
| --- | --- | --- | --- |
| Ingress Port | Ether Dst | Forward | Modify Fields |
| Port 4 | FF:FF:FF:FF:FF:FF | Output to port 8 | Set VLAN ID: Primary VLAN 2 |

Now the processing of downlink, unicast packets which are sent by the edge switch 111 and received by the host computer 121 is described. When host computer 121 receives the downlink unicast packet sent by the edge switch 111, it searches for a corresponding flow table entry according to the ingress port, source MAC address and destination MAC address of the downlink unicast packet. If the matching flow table entry is found, the unicast packet is forwarded according to the action of the flow table entry. If the flow table is not found, the downlink unicast packet is forwarded to the switch controller 130.

The switch controller 130 constructs a flow table entry for the downlink unicast packet according to the destination MAC address of the unicast packet. For example, if the destination MAC address of the downlink unicast packet is MAC 4, the downlink unicast packet is forwarded to VM 4 via port 4. Table 9 shows the flow table entry distributed for the downlink unicast packet.

TABLE 9

| Header Fields | | | | Action |
| --- | --- | --- | --- | --- |
| Ingress Port | VLAN ID | Ether Src | Ether Dst | Forward |
| Uplink Port 8 | Primary VLAN 2 | MAC 8 | MAC 4 | Output to port 4 |

When host computer 121 receives a downlink multicast packet or broadcast packet forwarded by the edge switch 111, and the source MAC address of the multicast packet or broadcast packet does not belong to the VDS where the host computer 121 resides, if the switch controller 130 receives the downlink multicast packet or broadcast packet forwarded by host computer 121, it distributes a flow table entry for the downlink multicast packet or broadcast packet to the virtual switch 141. For example, the packet is a downlink multicast packet, then a port included in the multicast group corresponding to the destination MAC address of the downlink multicast packet is configured and the multicast packet is forwarded via a port included in the corresponding multicast group. If the corresponding ports on host computer 121 included in the multicast group are port 4 and port 5, then the flow table entry distributed by the switch controller 130 to the virtual switch 141 is as shown in table 10.

TABLE 10

| Header Fields | | | | Action |
|---|---|---|---|---|
| Ingress Port | VLAN ID | Ether Src | Ether Dst | Forward |
| Uplink Port 8 | Primary VLAN 2 | MAC 8 | Multicast group MAC address | Output to port 4, port 5 |

The flow table distributed for the broadcast packet is similar to that distributed for the multicast packet, so it will not be described by examples herein.

Figure 2:
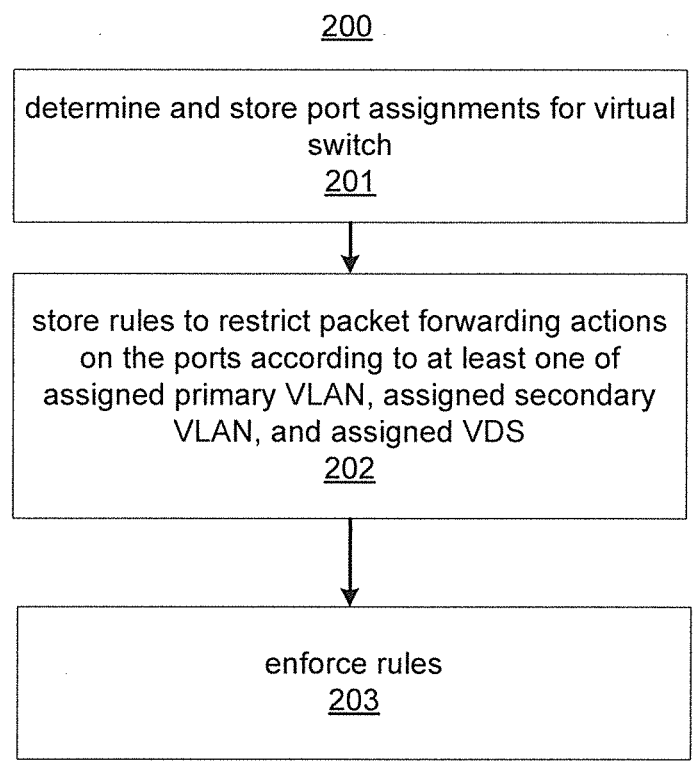
FIG. 2 illustrates a method for implementing a private virtual local area network in a switch controller according to an example.

A method 200 for creating a PVLAN in an SDN architecture is shown in FIG. 2, according to an example. The method 200 and the method 300 are described by way of example with respect to FIG. 1. At 201, port assignments are determined and stored. Ports of a virtual switch are assigned to a primary VLAN, a secondary VLAN and a VDS. For example, the switch controller 130 assigns the ports 1-3 of the virtual switch 140 shown in FIG. 1 to a primary VLAN, a secondary VLAN and a VDS. For example, ports 1 and 2 are assigned to isolated VLAN 1 and community VLAN 2. In one example, a system administrator enters port assignments into the switch controller 130 or the port assignments are received from another system. The port assignments are stored in the table 135 and distributed to the host computer 120 which stores the port assignments for the virtual switch 140 hosted by the host computer 120 along with VMs 1-3.

At 202, the rules 134 are stored to restrict packet forwarding actions on the ports according to at least one of the assigned primary VLAN, the assigned secondary VLAN, and the assigned VDS. Examples of the rules 134 and the packet forwarding action restricted and permitted by the rules 134 based on assigned VDS, primary VLAN and secondary VLAN are as follows. For the community VLAN, ports in the same community VLAN can communicate with each other, but cannot communicate with other community VLANs. Also, ports in a community VLAN can communicate with ports outside of the VDS. For the isolated VLAN, ports in the same isolated VLAN cannot communicate with each other. Ports in the isolated VLAN can only communicate with ports outside of the VDS where they are located, but they cannot communicate with ports in any isolated VLAN or community VLAN in the same VDS. The community VLAN and the isolated VLAN can both communicate with a switch for the primary VLAN 202 may be performed prior to 201 or after 201.

At 203, the switch controller 130 enforces the rules 134 to create a PVLAN. Enforcing the rules 134 may include discarding packets that do not satisfy the rules and creating and distributing flow entries for the virtual switch 140 for packets that satisfy the rules such as described in the examples above.

Figure 3:
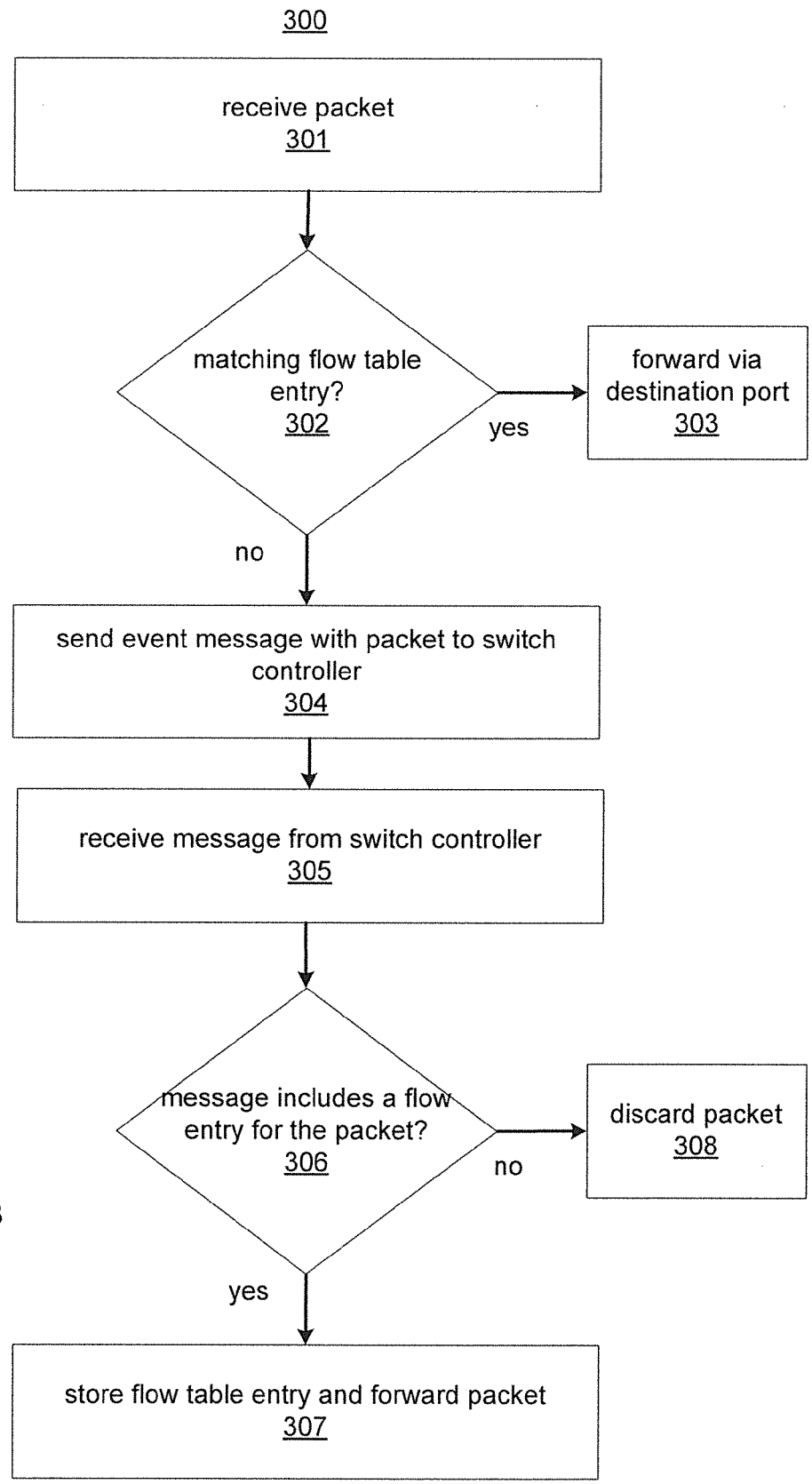
FIG. 3 illustrates a method performed by a virtual switch according to an example.

FIG. 3 illustrates a method 300 for example performed by a virtual switch, such as the virtual switch 140 or 141, for an uplink packet. At 301, a packet is received.

At 302, the virtual switch determines whether there is matching entry in the flow table for the packet for example based on source MAC address, destination address, and/or port number. If a matching entry is found at 302, the packet is forwarded via a destination port in the matching entry at 303. If the matching entry is not found, the packet is sent in an event message to the switch controller 130 at 304.

The switch controller 130 determines whether to discard the packet according to the rules 134 or create a flow table entry for the packet in the virtual switch if the corresponding rule for the packet is satisfied. The switch controller 130 sends a message to the virtual switch 140. The virtual switch 140 receives the message at 305, and determines whether the message includes a flow table entry for the packet at 306. If the message includes a flow entry, the flow entry is stored and the packet is forwarded according to the flow table entry at 307. If the message does not include a flow table entry, the packet may be discarded at 308. For example, the message may indicate that the packet is to be discarded or in another example the virtual switch does not receive a flow table entry for the packet and after a certain time period the packet is discarded.

Figure 4:
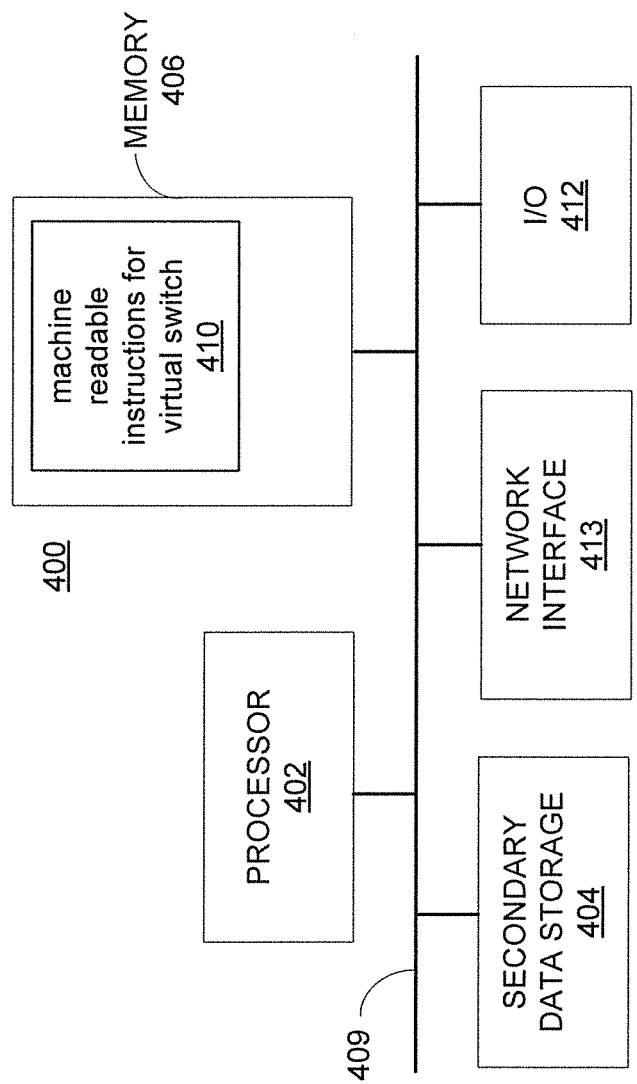
FIG. 4 illustrates a computer platform for the switch controller according to an example.

FIG. 4 shows a computer system 400 that may be used as a platform for the switch controller 130. The computer system 400 may execute, by one or more processors 402 or other hardware processing circuits, the methods, functions and other processes described herein for the switch controller 130. These methods, functions and other processes may be embodied as machine readable instructions stored on computer readable medium, which may be non-transitory, such as hardware storage devices (e.g., RAM (random access memory), ROM (read only memory), EPROM (erasable, programmable ROM), EEPROM (electrically erasable, programmable ROM), hard drives, and flash memory).

The computer system 400 also includes data storage. The data storage may include memory 406, such as random access memory (RAM). For example, machine readable instructions 410 may reside in the memory 406 during runtime. The machine readable instructions 410 may perform one or more of the methods and other functions for the switch controller 130 described above including the functions of the modules 131-133 described with respect to FIG. 1. The computer system 400 may include a secondary data storage 404, which may be non-volatile. The secondary data storage 404 may store the machine readable instructions 410 and any other information used by the switch controller 130, such as the rules 134 and information in the table 135 shown in FIG. 1. Commands and data from the processor 402 are communicated over a communication bus 409. The computer system 400 may include an I/O device 412, such as a keyboard, a mouse, a display, etc. The computer system 400 may include a network interface 413 for connecting to a network. Other known electronic components may be added or substituted in the computer system 400 and the computer system 400 may not include all the components shown in FIG. 4.

Figure 5:
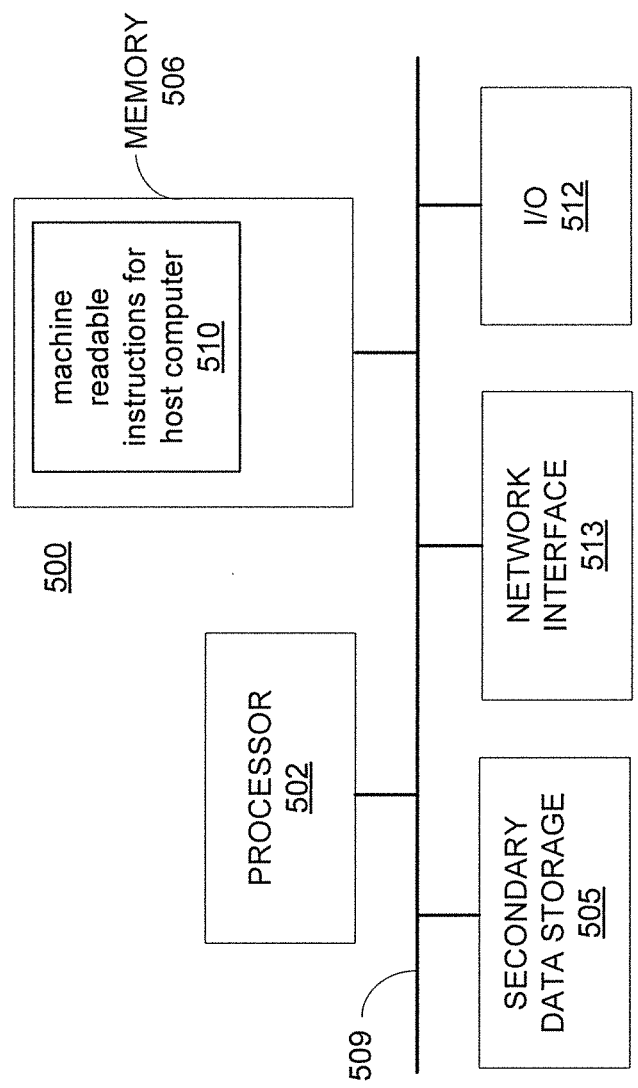
FIG. 5 illustrates a computer platform for the virtual switch according to an example.

FIG. 5 shows a computer system 500 that may be used as a platform for host computer, such as the host computer 120 or 121. The computer system 500 may execute, by one or more processors 502 or other hardware processing circuits, the methods, functions and other processes described herein for the host computers 120 and 121. These methods, functions and other processes may be embodied as machine readable instructions stored on computer readable medium, which may be non-transitory, such as hardware storage devices (e.g., RAM (random access memory), ROM (read only memory), EPROM (erasable, programmable ROM), EEPROM (electrically erasable, programmable ROM), hard drives, and flash memory).

The computer system 500 also includes data storage. The data storage may include memory 506, such as random access memory (RAM). For example, machine readable instructions 510 may reside in the memory 506 during runtime. The machine readable instructions 510 may perform one or more of the methods and other functions for the host computers 120 and 121 described above including the functions for the virtual switch 140 or 141 and for the VMs 1-6 described with respect to FIG. 1. The computer system 500 may include a secondary data storage 505, which may be non-volatile. The secondary data storage 505 may store the machine readable instructions 510 and any other information used by the virtual switch and/or VMs, such as the flow table 145 or 146. Commands and data from the processor 502 are communicated over a communication bus 509. The computer system 500 may include an I/O device 512, such as a keyboard, a mouse, a display, etc. The computer system 500 may include a network interface 513 for connecting to a network. Other known electronic components may be added or substituted in the computer system 500 and the computer system 500 may not include all the components shown in FIG. 5.

The above are just several examples of the present disclosure, and are not used for limiting the protection scope of the present disclosure. Any modifications, equivalents, improvements, etc., made under the principle of the present disclosure should be included in the protection scope of the present disclosure.

What is claimed is:

1. A switch controller connected to a computer hosting a virtual machine (VM) and a virtual switch to provide packet forwarding for the VM, the switch controller comprising:
   a memory to store assignments of ports in the virtual switch to a primary virtual local area network (VLAN), a secondary VLAN and a virtual distributed switch (VDS) and to store rules; and
   at least one processor to restrict packet forwarding actions on the ports according to at least one of the assigned primary VLAN, the assigned secondary VLAN, and the assigned VDS to the ports and the stored rules,
   wherein to restrict the packet forwarding actions, the at least one processor is to generate flow table entries for a flow table for the virtual switch based on the rules and the assignments of the ports, and send the flow table entries to the virtual switch, and
   wherein to generate the flow table entries, the at least one processor is to:
      receive an event message including a packet from the virtual switch, wherein the virtual switch sends the event message to the switch controller in response to determining there is no match for the packet in the flow table,
      determine whether to discard the packet or generate a flow table entry based on the rules and the port assignments, and
      in response to determining to generate the flow table entry, generate a flow table entry for the packet, and send the flow table entry to the virtual switch.

2. The switch controller of claim 1, wherein the rules comprise ports in a same community VLAN are approved to communicate with each other, but cannot communicate with other community VLANs, and ports in a community VLAN are approved to communicate with ports outside of a VDS.

3. The switch controller of claim 1, wherein the flow table entry includes a source or a destination media access protocol (MAC) address and a port in the virtual switch to forward the packet.

4. The switch controller of claim 3, wherein the packet is a unicast packet, multicast packet or a broadcast packet, and the virtual switch is a Virtual Edge Port Aggregator (VEPA) switch and the switch controller implements the OPEN-FLOW protocol.

5. The switch controller of claim 1, wherein the ports include an uplink port connected to an edge switch and a downlink port connected to the VM, and the uplink port is assigned to the primary VLAN and the downlink port is assigned to the secondary VLAN comprised of an isolated VLAN or a community VLAN.

6. The switch controller of claim 1, wherein the rules comprise:
   ports in a same isolated VLAN cannot communicate with each other, and if the ports are assigned to a VDS, the ports are approved to communicate with ports outside of the VDS.

7. The switch controller of claim 1, wherein the at least one processor is to receive the event message reported after starting of the VM and store a MAC address of the VM, and
   store a relationship between a source MAC address and a destination MAC address of the packet in the event message and a port in the virtual switch for forwarding the packet.

8. The switch controller of claim 1, wherein the event message from the virtual switch includes a unicast packet,
   wherein if an ingress port and a destination port for the unicast packet belong to different VDSs, the at least one processor is to construct a first flow table entry for the unicast packet, otherwise, discarding the unicast packet,
   wherein if the ingress port and the destination port belong to a same community VLAN in a same primary VLAN, the at least one processor is to construct a second flow table for the unicast packet, otherwise, discard the unicast packet, and
   wherein, header fields of the first and second flow table entries each include the ingress port and a destination MAC for the unicast packet, and an action field includes setting a VLAN to be the primary VLAN and forwarding via an uplink port.

9. The switch controller of claim 1, wherein the event message from the virtual switch includes a broadcast packet having an ingress port that is an uplink port in the virtual switch, and the at least one processor is to construct a flow table entry for the broadcast packet including the ingress port and a destination MAC address of the broadcast packet, and an action field comprising forwarding the broadcast packet through a destination port.

10. The switch controller of claim 1, wherein the event message from the virtual switch includes a multicast packet,
   wherein if the multicast packet has an ingress port that is a downlink port of the virtual switch, the at least one processor is to construct a flow table entry for the multicast packet including the ingress port and a destination MAC address for the multicast packet, and an action field comprising setting a VLAN to be a primary VLAN and forwarding through an uplink port,
   wherein if the multicast packet has an ingress port that is an uplink port of the virtual switch and a source port of the multicast packet belongs to an isolated VLAN, the at least one processor is to construct a second flow table entry including the ingress port, a source MAC address and a destination MAC address of the multicast packet, and an action field comprising forwarding through a port belonging to a different VDS from the source port, and the source port being a port corresponding to the source MAC address, and
   wherein if the multicast packet has an ingress port that is an uplink port of the virtual switch and a source port of the multicast packet belongs to a community VLAN, the at least one processor is to construct a third flow table entry including the ingress port, the source MAC address and the destination MAC address of the multicast packet, and an action field comprising forwarding through a port belonging to the community VLAN or a different VDS.

11. A non-transitory computer readable medium including machine readable instructions executable by at least one processor on a switch controller to:
store assignments of ports in a virtual switch to a primary VLAN, a secondary VLAN, and a VDS; and
restrict packet forwarding actions on the ports according to at least one of the assigned primary VLAN, the assigned secondary VLAN, and the assigned VDS to the ports and stored rules associated with packet forwarding for secondary community and isolated VLANs,
wherein to restrict the packet forwarding actions, the machine readable instructions executable by the at least one processor are to generate flow table entries for a flow table for the virtual switch based on the rules and the assignments of the ports, and send the flow table entries to the virtual switch,
wherein to generate the flow table entries, the machine readable instructions executable by at least one processor are to:
receive an event message including a packet from the virtual switch, wherein the virtual switch sends the event message to the switch controller in response to determining there is no match for the packet in the flow table,
determine whether to discard the packet or generate a flow table entry based on the rules and the port assignments, and
in response to determining to generate the flow table entry, generate a flow table entry for the packet, and send the flow table entry to the virtual switch.

12. A host computer to host a virtual switch connected to virtual machines (VMs) via downlink ports and connected to an edge switch via an uplink port, the host computer comprising at least one processor and a non-transitory computer readable medium storing instructions that when executed cause the at least one processor to:
receive a packet;
determine whether there is matching entry in a flow table for the packet based on at least one of source MAC address, a destination MAC address, and port number of an ingress port of the packet;
if the matching entry is not found, forward the packet in an event message to a switch controller, wherein the switch controller determines whether to create an entry in the flow table for the packet based on an assigned secondary VLAN for an ingress port and egress port for the packet and a virtual distributed switch (VDS) of the ingress and the egress port or whether to discard the packet.

13. The host computer of claim 12, wherein the non-transitory computer readable medium stores instructions that cause the at least one processor to receive the entry from the switch controller in response to the switch controller creating the entry.

14. The non-transitory computer readable medium of claim 11, wherein the rules comprise ports in a same community VLAN are approved to communicate with each other, but cannot communicate with other community VLANs, and ports in a community VLAN are approved to communicate with ports outside of a VDS.

15. The non-transitory computer readable medium of claim 11, wherein the rules comprise ports in a same isolated VLAN cannot communicate with each other, and if the ports are assigned to a VDS, the ports are approved to communicate with ports outside of the VDS.

16. The non-transitory computer readable medium of claim 11, wherein the event message from the virtual switch includes a multicast packet,
wherein if the multicast packet has an ingress port that is a downlink port of the virtual switch, the at least one processor is to construct a flow table entry for the multicast packet including the ingress port and a destination MAC address for the multicast packet, and an action field comprising setting a VLAN to be a primary VLAN and forwarding through an uplink port,
wherein if the multicast packet has an ingress port that is an uplink port of the virtual switch and a source port of the multicast packet belongs to an isolated VLAN, the at least one processor is to construct a second flow table entry including the ingress port, a source MAC address and a destination MAC address of the multicast packet, and an action field comprising forwarding through a port belonging to a different VDS from the source port, and the source port being a port corresponding to the source MAC address, and
wherein if the multicast packet has an ingress port that is an uplink port of the virtual switch and a source port of the multicast packet belongs to a community VLAN, the at least one processor is to construct a third flow table entry including the ingress port, the source MAC address and the destination MAC address of the multicast packet, and an action field comprising forwarding through a port belonging to the community VLAN or a different VDS.

* * * * *